(12) United States Patent
Spangler

(10) Patent No.: US 6,947,054 B2
(45) Date of Patent: Sep. 20, 2005

(54) ANISOTROPIC FILTERING

(75) Inventor: Steven J. Spangler, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 76 days.

(21) Appl. No.: 10/326,728

(22) Filed: Dec. 19, 2002

(65) Prior Publication Data

US 2004/0119720 A1 Jun. 24, 2004

(51) Int. Cl.[7] ............................................. G09G 5/00
(52) U.S. Cl. ....................... 345/582; 345/583; 345/587; 345/611; 345/612; 345/613; 382/260; 708/308
(58) Field of Search ................................. 345/582, 583, 345/608–613; 382/260; 708/308

(56) References Cited

U.S. PATENT DOCUMENTS

| | | | |
|---|---|---|---|
| 5,920,495 A | * | 7/1999 | Hicok et al. ................ 708/308 |
| 6,724,395 B1 | * | 4/2004 | Treichler .................... 345/582 |
| 2002/0126133 A1 | * | 9/2002 | Ewins ........................ 345/587 |

* cited by examiner

Primary Examiner—Matthew C. Bella
Assistant Examiner—Antonio Caschera
(74) Attorney, Agent, or Firm—Sharon Wong

(57) ABSTRACT

Embodiments of the invention provide an anisotropic filtering configuration where a ratio value is computed as the ratio of the major axis to the minor axis of a pixel projection on a texture map. The number of subpixels generated and sampled is based upon the value of the ratio. For four-way anisotropic filtering, subpixels are generated that move as the computed ratio between the major and minor axis increases. Subpixels may be placed anywhere from 0.5 to 1.5 texel distance from the pixel center depending on the computed ratio. The contribution of the subpixels is equally weighted.

16 Claims, 4 Drawing Sheets

ANISOTROPIC FILTERING

BACKGROUND

In three-dimensional graphics systems, three-dimensional images are typically represented on a two-dimensional display. A three-dimensional model space is defined and sections of the model space assigned to the pixels of the screen. Each pixel displays the combined visual effects such as color, shading, and transparency of the three-dimensional model space that is contained within its viewing frustum. The surfaces of the objects within a three-dimensional model space are generally defined by or reduced to a collection of three-dimensional polygons. Each polygon may be assigned attributes such as intensity, color and opacity, which affect the resulting pixels to be displayed on the CRT screen. These attributes are generally specified at the vertices of the polygons.

The visual characteristics of a polygon may be enhanced by texture mapping polygons, which are generally much larger than would be required using the previous approach. This process is comparable to applying contact paper to the surface of a three-dimensional object and is a well-known and widely used technique in computer graphics. The texture is represented by a two-dimensional array of data, each data element in the array is called a texel and the array is called a texture map. The texture map can represent intensity, color, opacity and many other spatially varying properties. The two coordinate axes of the texture coordinate space are defined by rows of columns of the array and are typically designated by U and V coordinates. A polygon is associated with a specific region of a texture map by relating the vertices of the polygon with individual U,V locations in a texture map. The texels, which lie within the area of the texture map circumscribed by the polygon, are sampled to produce pixels for display.

Anisotropic filtering is a technique to improve the quality of texture mapping where the projection of a circular pixel onto the texture map is oblique. Conventional anisotropic filtering techniques, such as that disclosed in Microsoft's DirectX 9 reference rasterizer, are expensive to implement in hardware.

DETAILED DESCRIPTION

Figure 1A:
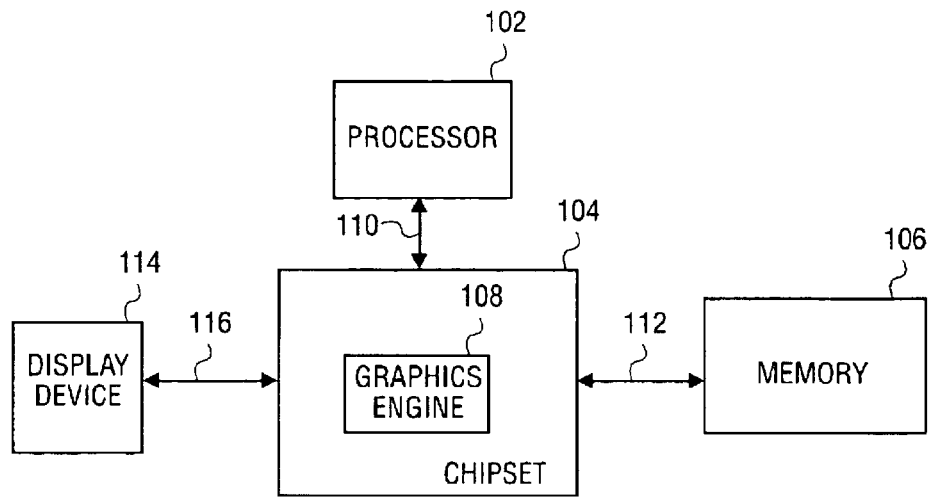
FIG. 1(a) illustrates an embodiment of a computer system for implementing an embodiment of the invention.

Embodiments of the invention provide an anisotropic filtering configuration where a ratio value is computed as the ratio of the major axis to the minor axis of a pixel projection on a texture map. The number of subpixels generated and sampled is based upon the value of the ratio. For four-way anisotropic filtering, subpixels are generated that move as the computed ratio between the major and minor axis increases. Subpixels may be placed anywhere from 0.5 to 1.5 texel distance from the pixel center depending on the computed ratio. The contribution of the subpixels is equally weighted.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 1(a). Sample system may be used, for example, to execute the processing for methods in accordance with the present invention, such as the embodiment described herein. Sample system is representative of processing systems based on the microprocessors available from Intel Corporation, although other systems (including personal computers (PCs) having other microprocessors, engineering workstations, set-top boxes and the like) may also be used.

Figure 1B:
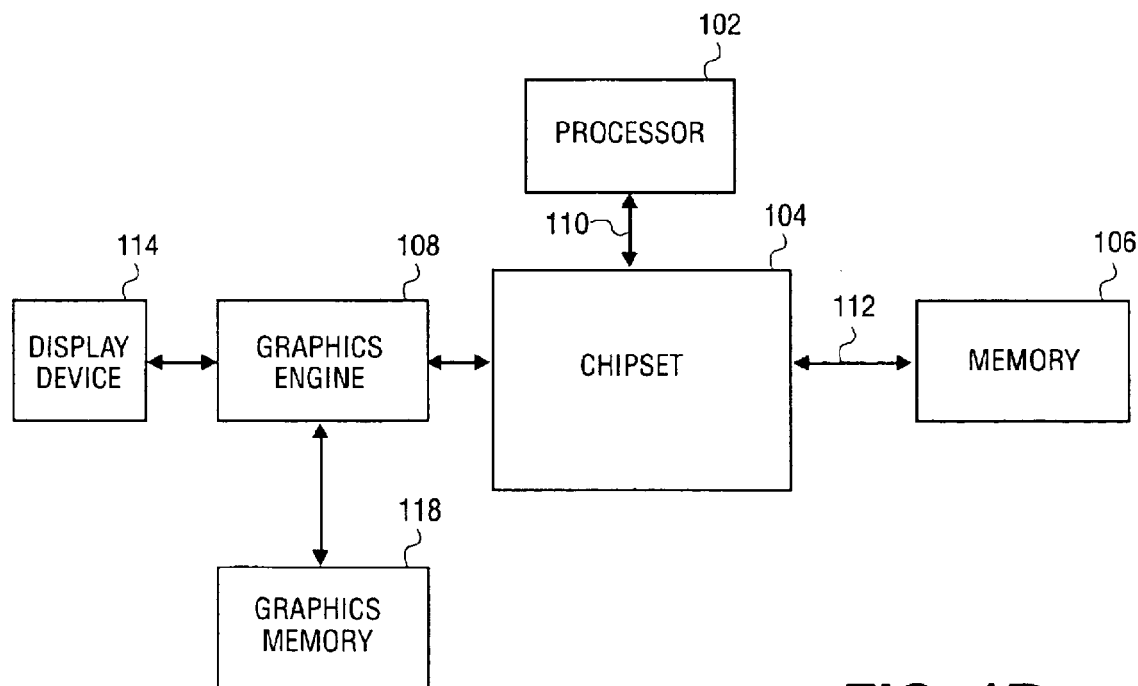
FIG. 1(b) illustrates another embodiment of a computer system for implementing an embodiment of the invention.

FIG. 1(a) illustrates an embodiment of a computer system for implementing an embodiment of the invention. The computer system includes processor 102, chipset 104 including graphics engine 108, memory 106 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 110 that transmits data signals between processor 102 and other components in the system. FIG. 1 is for illustrative purposes only. The present invention can also be utilized in a configuration including a descrete graphics device as shown in FIG. 1(b).

Processor 102 issues signals over bus 110 for communicating with chipset 104 and other devices in order to manipulate data as described herein. Processor 102 issues such signals in response to software instructions that it obtains from memory 106. Chipset 104 communicates with memory via bus 112. Chipset 104 may incorporate a memory controller, graphics and memory controller or/and other devices.

Memory 106 may be a dynamic random access memory (DRAM) device, a static random access memory (SRAM) device, or other memory device. Memory 106 may store instructions and/or data represented by data signals that may be executed by processor 102, graphics engine 108 or some other device. The instructions and/or data may comprise code for performing any and/or all of the techniques of the present invention. Memory 106 may also contain software and/or data. An optional cache memory (not shown) may be used to speed up memory accesses by the graphics engine 108 by taking advantage of its locality of access.

In some embodiments, graphics engine 108 can offload from processor 102 many of the memory-intensive tasks required for rendering an image. Graphics engine 108 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics engine 108 may be coupled to common bus 116 that transmits data signals between graphics engine 108 and other components in the system 100, including display device 114. Graphics engine 108 includes rendering hardware that among other things writes specific attributes (e.g. colors) to specific pixels of display 114 and draw complicated primitives on display device 114. Chipset 104 communicates with display device 114 for displaying images rendered or otherwise processed by graphics engine 108 for displaying images rendered or otherwise processed to a user. Display device 114 may comprise a computer monitor, television set, flat panel display or other suitable display device.

Memory 106 stores a host operating system that may include one or more rendering programs to build the images of graphics primitives for display. System 100 includes graphics engine 108, such as a graphics accelerator that uses customized hardware logic device or a co-processor to improve the performance of rendering at least some portion of the graphics primitives otherwise handled by host rendering programs. The host operating system program and its host graphics application program interface (API) control the graphics engine 108 through a driver program.

One skilled in the art will recognize that the present invention is not limited to the integrated graphics configuration shown in FIG. 1(a). Rather, embodiments of the present invention may be utilized in a discrete graphics configuration such as shown in FIG. 1(b). For example, in a discrete configuration, the graphics engine 108 is externally coupled to the system chipset. Moreover, in some embodiments, a separate graphics memory 118 is used to storage elements for storing graphical images.

In a typical implementation, processor 102 can issue graphics commands requesting that an image be rendered. Chipset 104 sends the graphics commands to graphics engine 108, which executes the commands, converting the object into primitives and then into fragments. A primitive is a graphical structure, such as a line, a triangle, a circle, or a surface patch of a solid shape, which can be used to build structures that are more complex. A fragment is a 2-D polygon created by clipping a primitive of image, such as a line, triangle, or circle, to the boundaries of a pixel. Graphics engine 108 renders the fragments, and loads the pixel data corresponding to the fragments into the appropriate storage elements of memory 106. While rendering each fragment, graphics engine 108 may determine a texel value, according to the principles of the invention, for modifying the pixel data. When the display device 114 renders pixel data modified by the texture data, displayed image has a texture.

Figure 2:
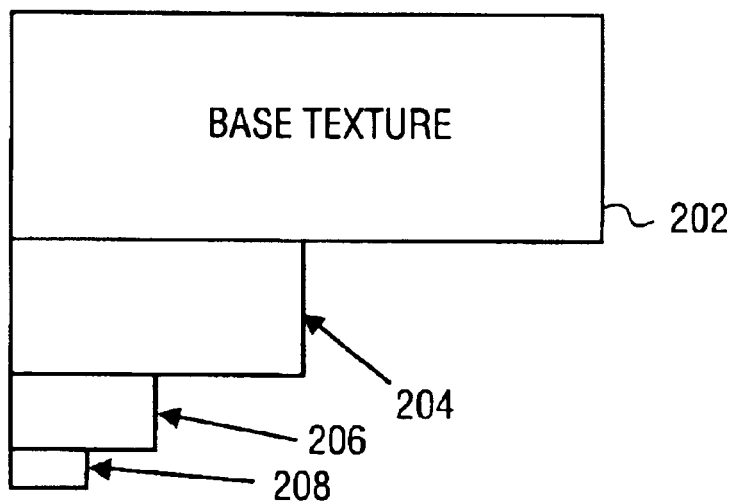
FIG. 2 illustrates an embodiment of a texture map configuration.

FIG. 2 illustrates an embodiment 200 of a texture map configuration. Memory also stores texture data organized in a mip-map. Mip-map is an ordered set of texture maps that each store texture data representing a predetermined texture image. The set of texture maps provides a range of resolutions or levels of detail (LOD) of that texture image. Each texture map is a 2-D array of data elements that store texture data representing the predetermined texture image. Conventionally, each data element of the 2-D array, called a texel, has a (u, v) coordinate.

For illustrative purposes, the exemplary mip-map includes four texture maps 202–208. Each texture map in succession provides less detail of the texture image. For example, the base texture map 202 provides the highest resolution of the texture image. Texture map 204 is a scaled down version of the base texture map 202 with half as many texels along each dimension u and v, and thus contains one fourth as many texels. This four-to-one texel area scaling continues to the next texture map 206 in the ordered set and again to the map 208 of lowest resolution.

Figure 3:
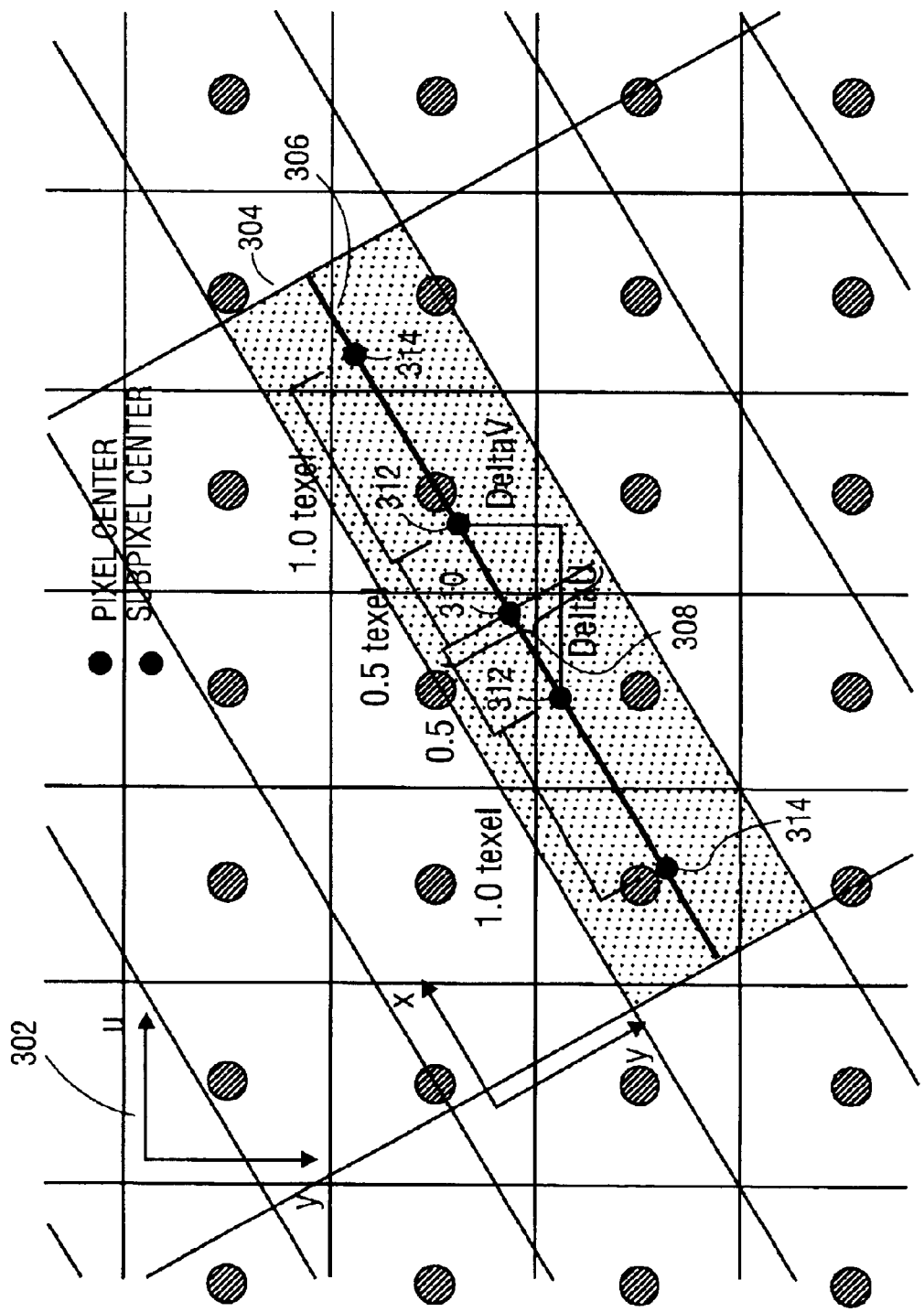
FIG. 3 is a diagram of an embodiment of a pixel grid mapped onto a texture map grid for anisotropic filtering.

FIG. 3 is a diagram of an embodiment 300 of a pixel grid mapped onto a texture map grid 302 for anisotropic filtering. Each texture map is a 2-D array of data elements that store texture data representing the predetermined texture image. Conventionally, each data element of the 2-D array, called a texel, has a (u, v) coordinate. Graphics engine 108 (FIGS. 1(a) and (b)) determines which texels affect a given pixel by projecting (i.e., mapping) a pixel onto selected texture maps of the mip-map. This mapping produces a pixel projection 304 in each selected texture map 302. Pixel projection 304 defines an area of covered texels, which can be sampled and filtered. Each pixel projection 304 is defined by major axis 306 and minor axis 308. Major axis 306 and minor axis 308 intersect each other at the center of the pixel projection.

Anisotropic filtering samples an area of texels that closely approximates the shape of the pixel projection. Preferably, the sampling points occur along the major axis 306 of the projected pixel projection. Texels are filtered at computed points (referred to as subpixels) along the major axis 306 in each selected texture map 302. The texel values are weighted and combined to produce the final texel value for modifying the final value of the pixel. Embodiments of the invention equally weigh the subpixel values generated.

The center of the pixel (x, y) 310 maps to the texture coordinates ($u_m$, $v_m$) at the midpoint of the major axis 306. The texture (u, v) coordinates for the center of the pixel projection are computed, which is the midpoint, ($u_m$, $v_m$), of the major axis 306. The midpoint corresponds to the center of the pixel 310 and is a reference point about which the subpixels are determined.

The ratio value is computed as the ratio of the major axis to the minor axis of the pixel projection. The number of subpixels generated and sampled is based upon the value of the ratio. For ratio=1, only the original center pixel is sampled.

For (1<ratio≦2), two subpixels 312 are sampled. Since reciprocals (divides) are expensive in hardware, only 1/ratio is needed, rather than the both ratio and 1/ratio In particular, the subpixel stepsize for subpixels 312 is generated in accordance with the following equation:

Subpixel Distance=1−1/ratio (Eq. 1)

For example, when ratio=1.5, the subpixel distance from pixel center is calculated as (1−1/1.5=0.3). Subpixels 312 are thus positioned 0.3 texels from pixel center 210. In another example, when ratio=2, the subpixel distance from pixel center is calculated as (1−1/2=0.5). Subpixels 312 are thus positioned 0.5 texels from pixel center 310.

For ratio >2, four subpixels 312, 314 are sampled. Subpixels 312 are located at a constant distance 0.5 from pixel center. Since varying the contribution of the subpixels requires sending information to the end of the pipeline, and also requires additional multipliers, an averaging function where all subpixels have equal contribution is used. Moving subpixels are created that move as the ratio increases from 0.5 to 1.5 texel distance from the pixel center. In particular, the subpixel stepsize for subpixels 314 is generated in accordance with the following equation:

Subpixel Distance=2.5−4/ratio (Eq. 2)

For example, when ratio =2.5, the subpixel distance from pixel center is calculated as (2.5-4/2.5 =0.9). Subpixels 314 are thus positioned approximately 0.9 texels from pixel center 310. For the exemplary pixel pixel projection, the subpixels are distributed symmetrically about the midpoint ($u_m$, $v_m$) of the major axis 306 at approximately 0.5 and 0.9 texels from the texel center.

For example, when ratio=3.0, the subpixel distance from pixel center is calculated as (2.5−4/3.0=1.2). Subpixels 314 are thus positioned approximately at 1.2 texels from pixel center 310. For the exemplary pixel pixel projection, the subpixels are distributed symmetrically about the midpoint ($u_m$, $v_m$) of the major axis 306 at approximately 0.5 and 1.2 texels from the texel center.

For example, when ratio=4, the subpixel distance from pixel center is calculated as (2.5-4/4=1.5). Subpixels 314 are thus positioned 1.5 texels from pixel center 310. For the exemplary pixel pixel projection, the subpixels are distributed symmetrically about the midpoint ($u_m$, $v_m$) of the major axis 306 at 0.5 and 1.5 texels from the texel center.

Embodiments of the invention generate subpixels next to the first two subpixels and as the computed ratio increases from 2 to 4, the outer subpixels are moved outwardly. The subpixels are each assigned an equal contribution (i.e. weight) so each of the four subpixels has an equal contribution for a four-way anisotropic configuration. There is thus no need to send a blend factor for the subpixels to the end of the pipeline that indicates how much contribution the outer subpixels have. Subpixels are generated that move as the computed ratio between the major and minor axis increases, generating subpixels that may be placed anywhere from 0.5 to 1.5 texel distance from the pixel center depending on the computed ratio. Since the contribution of each subpixel is equally weighted, it is not necessary to send contribution values to the back end of the pipeline, thus further minimizing costs.

One skilled in the art will recognize that more subpixels may be necessary to adequately sample the texels covered by the pixel projection and the configurations disclosed herein are for exemplary purposes only.

Figure 4:
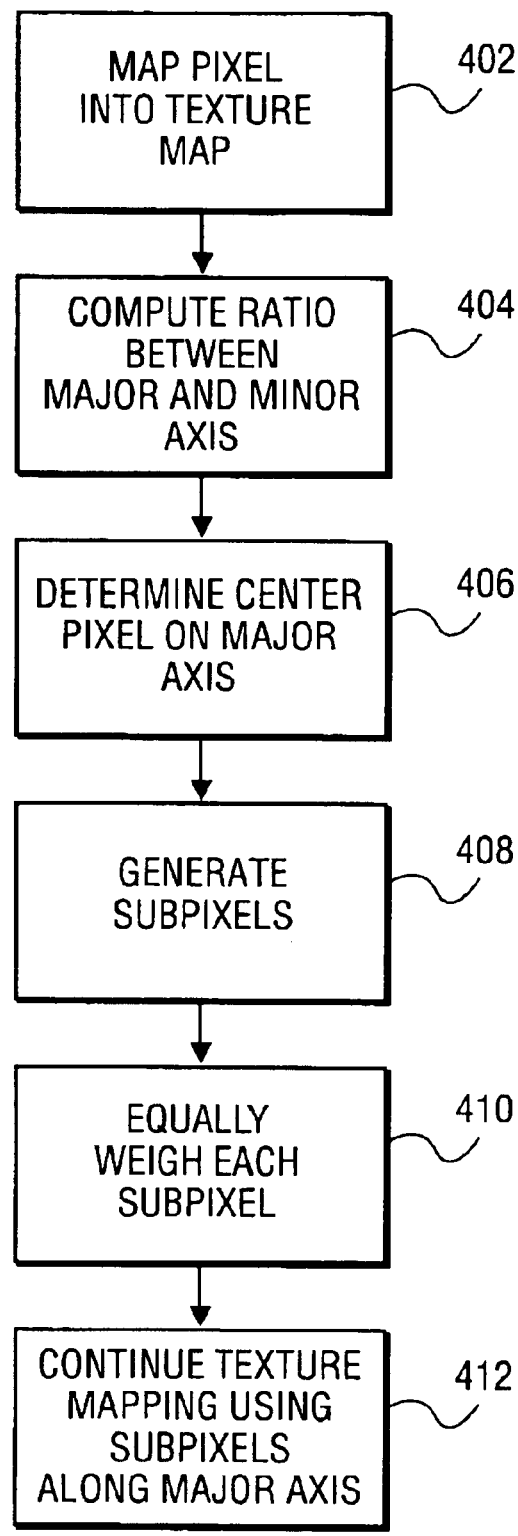
FIG. 4 illustrates a flowchart of an exemplary algorithm for anisotropic filtering.

FIG. 4 illustrates a flowchart of an exemplary algorithm for anisotropic filtering according to the invention.

In step 402, the (x, y) coordinates of a pixel are mapped into the point ($u_m$, $v_m$) in a texture map.

In step 404, the ratio between the lengths of the major axis and minor axis is computed.

In step 406, the center pixel on the major axis is determined.

In step 408, subpixels are generated on the major axis. For (1<ratio≦2), subpixels having a distance (1−1/Ratio) from pixel center are generated. For (ratio>2), subpixels having a distance (2.5−4/Ratio) and 0.5 from pixel center are generated.

In step 410, an equal weight is applied to each subpixel.

In step 412, the filtering operation samples texture data in the selected texture maps at subpixels along the major axis of the pixel projection.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for applying texture data, comprising:
projecting a pixel onto a texture map to define a pixel projection having a major and minor axis;

determining a length of the major and minor axis;

computing a ratio of between the lengths of the major axis and minor axis;

defining a center pixel on the major axis;

generating subpixels on the major axis that move in placement in accordance with the computed ratio, wherein for (1<ratio≦2), generating subpixels having a distance of or substantially of (1-1/Ratio) from pixel center; and sampling texture data at the subpixels.

2. The method claimed in claim 1, further comprising: applying an equal weight to each subpixel.

3. The method claimed in claim 1, wherein generating subpixels on the major axis that move in placement in accordance with the computed ratio further comprises:

increasing the distance between subpixels and the center pixel as the computed ratio increases.

4. A method for applying texture data, comprising:

projecting a pixel onto a texture map to define a pixel projection having a major and minor axis;

determining a length of the major and minor axis;

computing a ratio of between the lengths of the major axis and minor axis;

defining a center pixel on the major axis;

generating subpixels on the major axis that move in placement in accordance with the computed ratio, wherein for (ratio>2), generating outwardly disposed subpixels having a distance of or substantially of (2.5-4/Ratio) and 0.5 from pixel center; and sampling texture data at the subpixels.

5. A machine readable medium having stored therein a plurality of machine readable instructions executable by a processor to apply texture data, comprising:

instructions to project a pixel onto a texture map to define a pixel projection having a major and minor axis;

instructions to determine a length of the major and minor axis;

instructions to compute a ratio of between the lengths of the major axis and minor axis;

instructions to define a center pixel on the major axis;

instructions to generate subpixels on the major axis that move in placement in accordance with the computed ratio, wherein for (1<ratio≦2), instructions to generate subpixels having a distance of or substantially of (1-1/ratio) from pixel center; and instructions to sample texture data at the subpixels.

6. The machine readable medium claimed in claim 5, further comprising:

instructions to apply an equal weight to each subpixel.

7. The machine readable medium claimed in claim 5, wherein instructions to generate subpixels on the major axis that move in placement in accordance with the computed ratio further comprises:

instructions to increase the distance between subpixels and the center pixel as the computed ratio increases.

8. A machine readable medium having stored therein a plurality of machine readable instructions executable by a processor to apply texture data, comprising:

instructions to project a pixel onto a texture map to define a pixel projection having a major and minor axis;

instructions to determine a length of the major and minor axis;

instructions to compute a ratio of between the lengths of the major axis and minor axis;

instructions to define a center pixel on the major axis;

instructions to generate subpixels on the major axis that move in placement in accordance with the computed ratio, wherein for (ratio>2), instructions to generate outwardly disposed subpixels having a distance of or substantially of (2.5-4/Ratio) and 0.5 from pixel center; and instructions to sample texture data at the subpixels.

9. A computer system for applying texture data, comprising:

a memory to store information for a texture map; and a graphics engine to project a pixel onto the texture map to define a pixel projection having a major and minor axis, determine a length of the major and minor axis, compute a ratio of between the lengths of the major axis and minor axis, define a center pixel on the major axis, generate subpixels on the major axis that move in placement in accordance with the computed ratio wherein for (1>ratio≦2), the graphics engine generates subpixels having a distance of or substantially of (1-1/Ratio) from pixel center, and sample texture data at the subpixels.

10. The system claimed in claim 9, wherein the graphics engine applies an equal weight to each subpixel.

11. The system claimed in claim 9, wherein the graphics engine increases the distance between subpixels and the center pixel as the computed ratio increases.

12. A computer system for applying texture data, comprising:

a memory to store information for a texture map; and a graphics engine to project a pixel onto the texture map to define a pixel projection having a major and minor axis, determine a length of the major and minor axis, compute a ratio of between the lengths of the major axis and minor axis, define a center pixel on the major axis, generate subpixels on the major axis that move in placement in accordance with the computed ratio wherein for (ratio>2), the graphics engine generates outwardly disposed subpixels having a distance of or approximately of (2.5-4/Ratio) and 0.5 from pixel center and sample texture data at the subpixels.

13. An anisotropic filter, comprising:

a graphics engine to project a pixel onto a texture map to define a pixel projection having a major and minor axis, determine a length of the major and minor axis, compute a ratio of between the lengths of the major axis and minor axis, define a center pixel on the major axis, generate subpixels on the major axis that move in placement in accordance with the computed ratio wherein for (1 <ratio≦2), the graphics engine generates subpixels having a distance of or substantially of (1-1/Ratio) from pixel center, and sample texture data.

14. The anisotropic filter claimed in claim 13, wherein the graphics engine applies an equal weight to each subpixel.

15. The anisotropic filter claimed in claim 13, wherein the graphics engine increases the distance between subpixels and the center pixel as the computed ratio increases.

16. An anisotropic filter, comprising:

a graphics engine to project a pixel onto a texture map to define a pixel projection having a major and minor axis, determine a length of the major and minor axis, compute a ratio of between the lengths of the major axis and minor axis, define a center pixel on the major axis, generate subpixels on the major axis that move in placement in accordance with the computed ratio wherein for (ratio>2), the graphics engine generates outwardly disposed subpixels having a distance of or substantially of (2.5-4/Ratio) and 0.5 from pixel center, and sample texture data.

* * * * *

UNITED STATES PATENT AND TRADEMARK OFFICE
CERTIFICATE OF CORRECTION

PATENT NO. : 6,947,054 B2
DATED : September 20, 2005
INVENTOR(S) : Spangler

It is certified that error appears in the above-identified patent and that said Letters Patent is hereby corrected as shown below:

<u>Column 8,</u>
Line 17, delete "($1 > \text{ratio} \leq 2$)" and insert -- ($1 < \text{ratio} \leq 2$) --.

Signed and Sealed this

Third Day of January, 2006

JON W. DUDAS
*Director of the United States Patent and Trademark Office*